(12) United States Patent
Saito et al.

(10) Patent No.: US 11,485,397 B2
(45) Date of Patent: Nov. 1, 2022

(54) TROLLEY COUPLING STRUCTURE

(71) Applicant: NANSIN CO., LTD., Tokyo (JP)

(72) Inventors: Akinori Saito, Tokyo (JP); Kenji Yamaguchi, Tokyo (JP); Nao Kanamori, Tokyo (JP)

(73) Assignee: NANSIN CO., LTD., Tokyo (JP)

(*) Notice: Subject to any disclaimer, the term of this patent is extended or adjusted under 35 U.S.C. 154(b) by 588 days.

(21) Appl. No.: 16/499,397

(22) PCT Filed: Mar. 29, 2017

(86) PCT No.: PCT/JP2017/013126
§ 371 (c)(1),
(2) Date: Jan. 2, 2020

(87) PCT Pub. No.: WO2018/179194
PCT Pub. Date: Oct. 4, 2018

(65) Prior Publication Data
US 2020/0207395 A1    Jul. 2, 2020

(51) Int. Cl.
*B62B 5/00* (2006.01)
*B60D 1/48* (2006.01)
*B60D 1/00* (2006.01)

(52) U.S. Cl.
CPC ............... *B62B 5/00* (2013.01); *B60D 1/481* (2013.01); *B62B 5/0083* (2013.01);
(Continued)

(58) Field of Classification Search
CPC ....... B62B 5/00; B62B 5/0083; B62B 5/0093; B62B 2207/02; B60D 1/481; B60D 2001/005
See application file for complete search history.

(56) References Cited

U.S. PATENT DOCUMENTS

| 9,988,062 | B2* | 6/2018 | Stahl | ........................ B62B 3/16 |
| 2009/0085315 | A1* | 4/2009 | Meers | ....................... B62B 3/02 |
| | | | | 29/428 |
| 2017/0151974 | A1* | 6/2017 | Stahl | .................... B62B 3/1476 |

FOREIGN PATENT DOCUMENTS

| JP | H08-026120 A | 1/1996 |
| JP | 2001-247042 A | 9/2001 |

(Continued)

OTHER PUBLICATIONS

International Search Report dated May 16, 2017, issued in counterpart International Application No. PCT/JP2017/013126 (2 pages).
(Continued)

*Primary Examiner* — Bryan A Evans
(74) *Attorney, Agent, or Firm* — WHDA, LLP

(57) ABSTRACT

The present invention relates to a novel trolley coupling structure that allows coupling of base parts of trolleys aligned in the vertical or horizontal direction. The present invention provides a trolley coupling structure in which a first receiving recess part is provided in a base part of one trolley, a second receiving recess part is provided in a base part of another trolley, a locking member is pivotally attached to the first receiving recess part, a recess part body and a bent section are formed in the respective first and second receiving recess parts, and retaining of the locking member is achieved by constraining and locking a constraining piece part of the locking member at the bent section.

4 Claims, 5 Drawing Sheets

(52) U.S. Cl.
CPC ...... *B62B 5/0093* (2013.01); *B60D 2001/005* (2013.01); *B62B 2207/02* (2013.01)

(56) References Cited

FOREIGN PATENT DOCUMENTS

| | | |
|---|---|---|
| JP | 2004-230998 A | 8/2004 |
| JP | 2014-054926 A | 3/2014 |
| JP | 2000-95245 A | 8/2017 |

OTHER PUBLICATIONS

PCT/ISA/237 dated May 16, 2017, issued in counterpart International Application No. PCT/JP2017/013126.

* cited by examiner

TROLLEY COUPLING STRUCTURE

TECHNICAL FIELD

The present invention relates to an improvement in trolley coupling structure.

BACKGROUND ART

In conventional coupling structures of trolleys, there has been known a structure in which a protruding part and a recess part are provided on an edge part of a base part of one trolley, a recess part is provided on an edge part of a base part of the other trolley at a position corresponding to the protruding part, a protruding part is provided on the same at a position corresponding to the recess part, thereby achieving concavo-convex engagement.

However, in such coupling, there is a risk that vertical vibration caused when the trolleys get over a step leads to uncoupling.

Further, at the time of achieving the coupling with the use of a different part such as a pin, the uncoupling is likewise apt to occur since the base parts are simply locked, and whether the coupling has been achieved cannot be determined by seeing from outside.

CITATION LIST

Patent Literature

Patent Document 1: Japanese Unexamined Patent Application Publication No. Hei 8-26120
Patent Literature 2: Japanese Unexamined Patent Application Publication No. 2000-95245

SUMMARY OF INVENTION

Technical Problem

To solve the above-described problem, the present invention provides a trolley coupling structure in which, at the time of coupling a base part of one trolley with a base part of another trolley, a locking member is fixed to the base part of any one of the trolleys, and which enables visually and sensuously confirming a fixed state.

Solution to Problem

To solve the problem, in the invention according to claim 1, the present invention is characterized by providing a trolley coupling structure which enables coupling base parts of trolleys aligned in a longitudinal or lateral direction, the trolley coupling structure including:

a first receiving recess part which is opened at a base part end edge provided to the base part of one trolley and includes a first recess part body which extends toward the inner side of the base part and a first bent section which bends in a direction crossing the first recess part body on a tip side, and has an opened upper surface;

a second receiving recess part which is opened at a base part end edge provided to the base part of the other trolley, includes a second recess part body extending toward the inner side of the base part and being configured to communicate with the first recess part body and a second bent section bending in a direction crossing the second recess part body on a tip side, and has an opened upper surface; and a locking member which is fitted in the first receiving recess part or the second receiving recess part and includes a body part which is pivotally attached to a base end side of the first recess part body through a pivot and extends along the first recess part body or the second recess part body, and a lock lever including a constraining piece part which is configured to be fitted in the first bent section or the second bent section at a tip of the body part and protruding part which is separated from the constraining piece part with a gap therebetween and engages with a lock receiving part formed in the first recess part body or the second recess part body, wherein a constraining wall part which constrains movements of the locking member, a first space which is provided in the first bent section or the second bent section and moves the constrained lock lever in an unlocking direction, and a second space configured to pull out the constraining piece part from the first bent section or the second bent section are provided in the first receiving recess part or the second receiving recess part.

The invention according to claim 2 is characterized in that a base end of the locking member is divided into a first branch part and a second branch part to form a gap part therebetween, a pair of first and second pivots are laterally protruded on the first branch part, a third pivot is protruded on an outer side of the second branch part, and first and third bearing parts to which a first shaft part and a third shaft part are disposed are formed on a peripheral wall of the first recess part body surrounding the base end side of the locking member, and a bearing holding raised part which is closely fitted in the gap part between the first branch part and the second branch part at the time of folding, has a second bearing groove in which the second pivot is fitted, and tilts in a direction along which a sidewall contacting with the second branch part is separated from the third bearing groove is provided in the first or second receiving recess part.

The invention according to claim 3 is characterized in that the first bent section of the first receiving recess part and the second bent section of the second receiving recess part are formed to be symmetrical with an axial line of the pivots of the first receiving recess part as a center.

The invention according to claim 4 is characterized in that the bearing portion has a protruding portion whose recess part protrudes outward on the base end side of the first branch part, the first bearing part is formed on a peripheral wall of the protruding portion, a protruding portion which achieves close fitting and protrudes outward is formed to the first branch part in correspondence with the protruding portion, and the first shaft part is formed on the peripheral wall of the protruding portion.

Advantageous Effects of Invention

In the trolley coupling structure according to this invention, when the locking member is not used, since it is fitted and locked in the first receiving recess part, it does not protrude onto the base part and does not become an obstruction.

At the time of coupling the base parts of the trolleys, since the locking member is half-rotated on a pivot position of the first receiving recess part as a base point, fitted in the second receiving recess part, and locked, the locking member does not protrude onto the base part even when the coupling is achieved, the locking member is not unlocked even if the trolleys vibrate in the up-and-down and left-and-right directions, and the safety is assured.

Further, since the locking member does not protrude from the first and second receiving recess parts in the locked state, the visual confirmation can be readily performed from the outside, and the sensual recognition by a user is enabled.

DESCRIPTION OF EMBODIMENTS

A preferred embodiment according to a trolley coupling structure in which base parts of a plurality of trolleys aligned in a longitudinal or lateral direction are detachably coupled will now be described hereinafter with reference to the drawings.

In the present invention, any trolley which has wheels such as casters on a bottom surface of a base part can suffice, presence or absence of a handle is not a matter, and a trolley enclosed with a cage is included.

EXAMPLE 1

Figure 1:
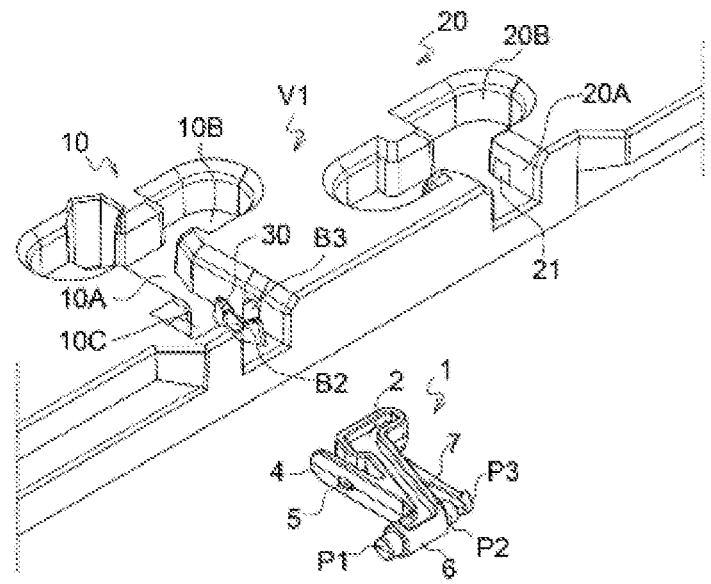
FIG. 1 is a local perspective view showing a first receiving recess part and a second receiving recess part formed in the same base part, and a locking member.
Figure 2:
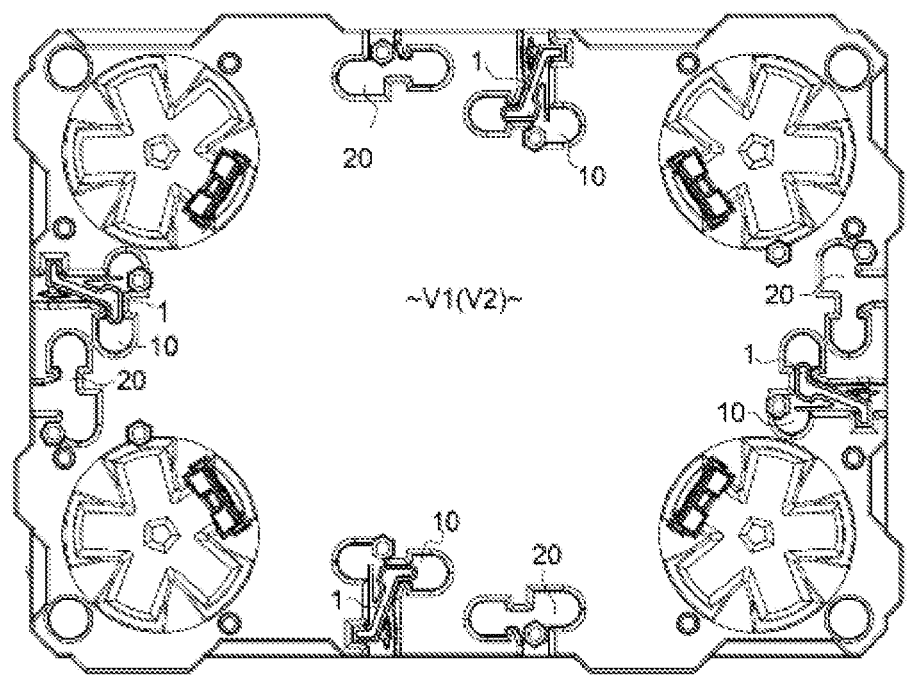
FIG. 2 is a plan view showing an example of the base part of a trolley.
Figure 3:
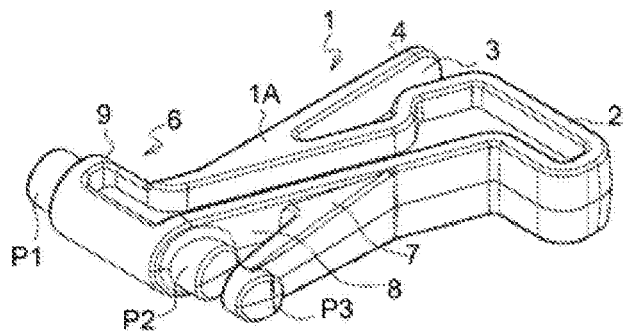
FIG. 3 is a perspective view of the locking member seen from a base end side.
Figure 4:
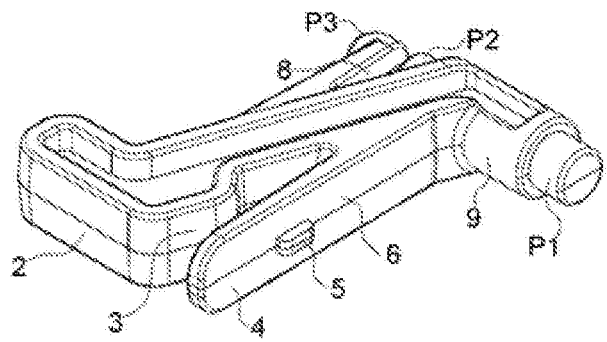
FIG. 4 is a perspective view of the locking member seen from a tip side.
Figure 5:
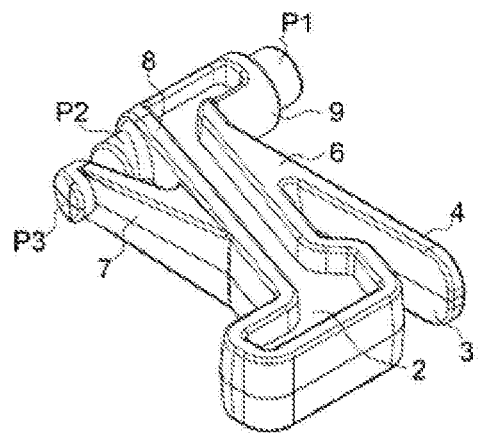
FIG. 5 is a perspective view of the locking member in a different direction seen from the tip side.

In one trolley shown in FIG. 1 and FIG. 2, a first receiving recess part 10 is formed on an upper surface of a base part V1 which becomes a cargo bed.

The first receiving recess part 10 is configured to receive a later-described locking member 1 in such a manner that the locking member 1 does not protrude from the upper surface of the base part V1 when it is not used (when it is folded), and a recess part is opened on an end surface side in a side edge part of the base part V1 to lay the locking member 1 over the trolleys when the locking member 1 is used (developed).

In the first receiving recess part 10 are formed a first recess part body 10A which extends toward the inner side of the base part V1, a first bent section 10B which crosses the first recess part body 10A on a tip side and laterally bends, and a third bent section 10C which bends to one of left and right sides (the left side in the illustrated example) near a base end, and an upper surface is opened.

Further, in FIG. 1, a second receiving recess part 20 is provided to be aligned with the first receiving recess part 10 in the base part V1 of the same trolley, but the second receiving recess part 20 which forms a pair with the first receiving recess part 10 is formed in a base part V2 of the other trolley (see FIG. 9 and FIG. 10) which is coupled with the one trolley.

To mutually couple the one trolley with the other trolley, the first receiving recess part 10 and the second receiving recess part 20 are formed in each trolley.

The second receiving recess part 20 is configured to receive the later-described locking member 1 in such a manner that the locking member 1 does not protrude from the upper surface of the bas part V1 when it is used (when it is developed), and a recess part is opened on an end surface side in the side edge part of the base part V1 to lay the locking member 1 over the trolleys when it is used (when it is developed).

In the second receiving recess part 20 are formed a second recess part body 20A which extends toward the inner side of the base part V1 and a second bent section 20B which crosses the second recess part body 20A on a tip side and laterally bends, and an upper surface is opened.

Further, the locking member 1 is received in the first receiving recess part 10 when it is not used, and it is laid over the first receiving recess part 10 and the second receiving recess part 20 and fitted in them respectively when it is used.

Pivots (later-described P1, P2, and P3 in the illustrated example) which are fitted in the first receiving recess body 10A on a base end side and extend on the same axial line are provided at an end part of the locking member 1.

This locking member 1 has a body part 1A which has the pivots on the base end side and extends in such a manner that it can be fitted in the first recess body 10A or the second recess body 20A, a constraining piece part 2 which extends from the body part 1A and bends in such a manner that it can be fitted in the first bent section 10 or the second bent section 20, and an unlocking lever piece part 4 which branches from the constraining piece part 2 and extends along one side surface of the body part 1A as the same plane to interpose a space part 3.

This lever piece part 4 is separated from the body part 2 to branch from the constraining piece part 2 and has the space part 3 between itself and the constraining piece part 2, and one engaging structure part 5 which achieves concavo-convex engagement is formed on an outer side surface of the lever piece part 4.

Furthermore, the other concavo-convex engaging parts 11 and 21 which achieve the concavo-convex engagement in correspondence with the one engaging structure part 5 are formed in the first recess part body 10A and the second recess part body 20A, respectively.

In this example, the one engaging structure part 5 is formed of a protruding part which protrudes outward from the side surface of the lever piece part 4, and each of the other engaging structure parts 11 and 21 is formed of a recess part (a receiving part) which can engage with the protruding part, but the concavo-convex arrangement may be inverted in this invention.

It is preferred for the lever piece part 4 to have the elasticity so that the concavo-convex engagement can be released when its tip is held and the lever piece part 4 is moved toward the space part 3 side.

The first receiving recess part 10 or the second receiving recess part 20 has constraining wall parts 14 and 15 or 24 and 25 which substantially closely come into contact with a part of a sidewall of the locking member 1 and constrain the same so that the locking member 1 received in the recess part does not float from the recess part or come off.

Here, at the time of coupling the trolleys, since the constraining piece part 2 of the locking member 1 is locked in the second bent section 20B of the second receiving recess part 20 on the coupling side, the coupled locking member 1 does not come off by the locking of the bent section when force is applied in a direction along which the coupled trolleys are separated from each other.

Figure 9:
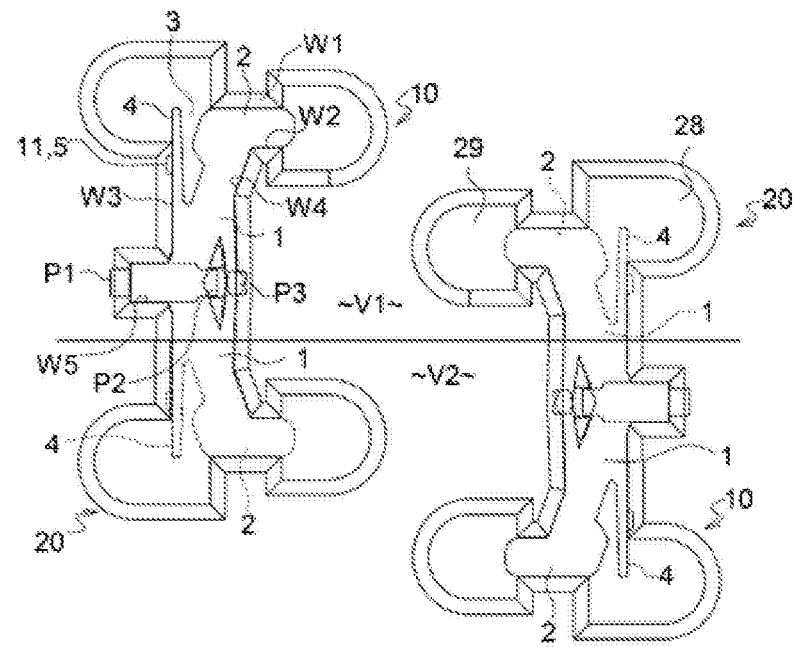
FIG. 9 is an explanatory drawing showing with the use of a dotted line a developed state in which the first receiving recess part and the second receiving recess part are arranged to communicate with each other along a lateral side of the base parts and the locking part is laid, and showing with the use of a solid line a folded state where the locking member is received.

The one constraining wall part 14 or 24 is in close contact with a substantially horizontal first sidewall w1 on a tip side of the constraining piece part 2 and a second sidewall w2 facing the first sidewall w1, and the other constraining wall part 15 or 25 is in close contact with lateral third and fourth sidewalls w3 and w4 of the body part 1A connected with the second sidewall w2 and a side wall w5 of a protruding part 9 in which a first pivot P1 is formed on a base end side of the lever piece 4, thereby regulating the movement of the locking member 1 in the up-and-down and left-and-right directions (see FIG. 9).

Moreover, in the first receiving recess part 10 or the second receiving recess part 20, a first space 18 or 28 and a second space 19 or 29 configured to hold and pull out the lever piece part 4 and the constraining piece part 2 of the coupling member 1 fitted and constrained in each recess part are arranged in a laterally staggered manner. In the illustrated example, the first space 18 or 28 is arranged on an inner side in the base part and the second space 19 or 29 is arranged on a front side in the base part in an asymmetrically staggered manner.

In the present invention, the number of the pivot of the locking member 1 may be one, but the pivot is divided to enable attachment or detachment of the locking member 1 to or from the first recess part body 10A.

That is, in this example, the base end of the locking member 1 is divided into a first branch part 6 and a second branch part 7, and the space part 3 is formed therebetween.

A pair of first and second pivots P1 and P2 is laterally protruded on the first branch part 6, and a third pivot P3 is protruded on the outer side of the second branch part 7.

In the illustrated example, a protruding part 9 which outwardly bends and protrudes is formed at a base end of the first branch part 6, the first pivot P1 is protruded at a tip of the protruding part 9, and the second pivot P2 is protruded on the other side along the same axial line.

In a peripheral wall of the first recess part body 10A surrounding the base end side of the locking member 1, first and third bearing parts B1 and B3 to which the first bearing part P1 and the third bearing part P3 are disposed are formed.

Figure 6:
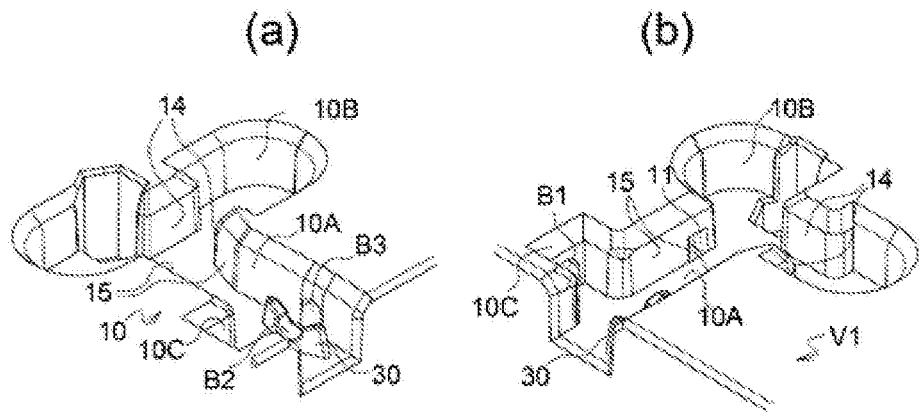
FIG. 6(a) is a perspective view of the first receiving recess part seen from a base end side and FIG. 6(b) is a perspective view of the same seen from a different direction.
Figure 7:
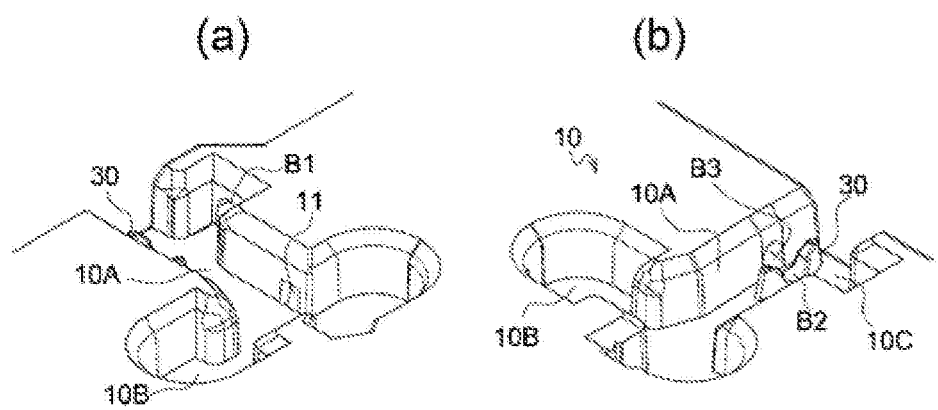
FIG. 7(a) is a perspective view of the first receiving recess part seen from a tip side and FIG. 7(b) is a perspective view of the same seen from a different direction.
Figure 8:
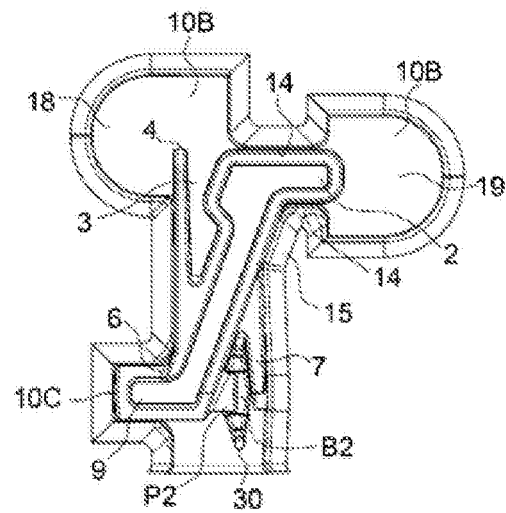
FIG. 8 is a plan view showing a state where the locking member is pivotally attached to and fitted in the first receiving recess part.

In each of the first and second receiving recess parts 10 and 20, a bearing holding raised part 30 is provided (see FIGS. 6 and 7).

The bearing holding raised part 30 is arranged at a position where it is closely fitted in a gap part 8 between the first branch part 6 and the second branch part 7 when the locking member 1 is folded, and it has a second bearing groove B2 in which the second pivot P2 is fitted at its center.

Additionally, a sidewall which is in contact with the second branch part 7 tilts in a direction to be separated from the second bearing groove B2 so that the third pivot 3 can be readily attached to or detached from the third bearing part B3.

With the above-described configuration, the first recess part main body 10A of the first receiving recess part 10 is different from the second recess part body 20A of the second receiving recess part 20 in that the former has the pivot positions of the locking member 1 but the latter has no such positions, and they have thus different lengths, but the first bent section 10B and the second bent section 20B are formed in such a manner that a symmetrical shape can be formed with an axial line of the pivots of the first receiving recess part 10 as the center.

Further, in this example, a third bent section 10C which bents at a position close to the base end of the first recess part body 10A is formed to the first recess part body 10A in which the bearing portions are formed so that the bearing portions of the locking member 1 are engaged when the base parts V1 and V2 are coupled with each other.

In correspondence with this, the base end side of the first branch part 6 of the locking member 1 is bent to be fitted in the third bent section 10C, the first pivot P1 is formed on the outer side of this part, and a first bearing part B1 which bears the first pivot P1 is formed in the third bent section 10C.

Consequently, since the locking member 1 is constrained by the first bent section 10B and the third bent section 10C when it is folded or constrained by the third bent section 10C and the second bent section 20B when it is developed, a reception posture is held both when the locking member 1 is folded and when the same is developed even if movement in any direction is applied to the base parts V1 and V2 of the trolleys, and uncoupling does not occur when the trolleys are coupled.

In this invention, the example where the pivot is divided into the first to third pivots P1 to P3 has been described, but any pivots which are pivotally supported in the left and right bearing grooves formed on the base end side of the first receiving recess part can suffice, and one or two divided pivots may be used.

Furthermore, the fitting of the pivots and the bearing grooves may be achieved by using elasticity, press-fitting without using the elasticity, or hooking.

In this example, since the base part structures of both the trolleys to be coupled are the same, the first receiving recess part 10 and the second receiving recess parts 20 are arranged to be adjacent to each other.

Consequently, when one trolley is laterally or longitudinally inverted to the other trolley, the base part V1 of the one trolley on the coupling side and the base part V2 of the other trolley on the coupled side can be used without changing their structures.

Figure 10:
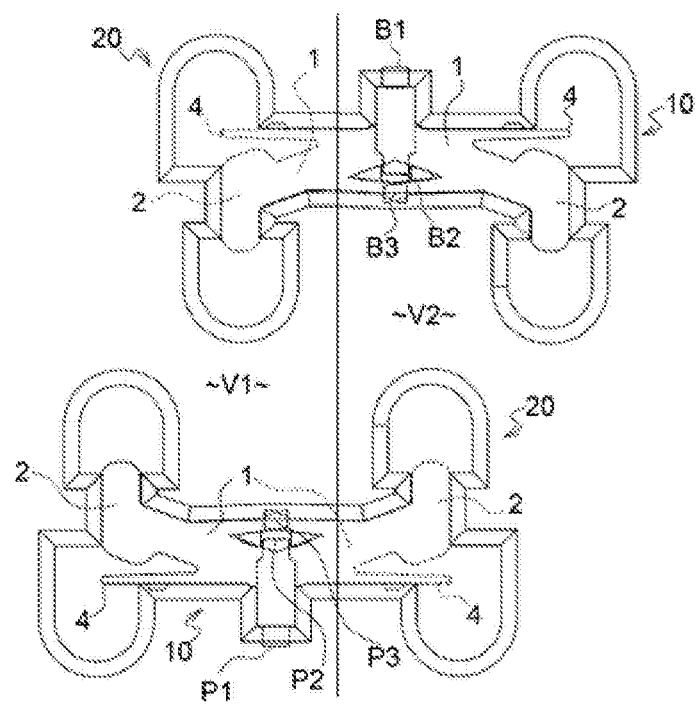
FIG. 10 is the same view as FIG. 9 along a longitudinal side of the base parts.
Figure 11:
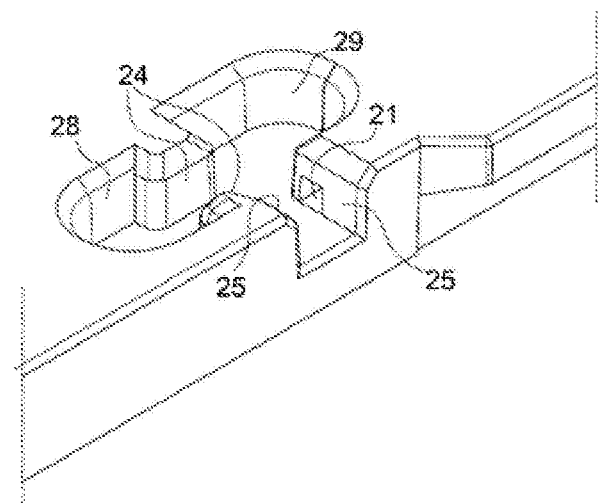
FIG. 11 is a perspective view of the second receiving recess part seen from the base end side.

Moreover, like the illustrated example, when the first receiving recess part 10 and the second receiving recess part 20 are arranged to be adjacent to each other in the base part of the same trolley, the locking member 1 pivotally attached to the first receiving recess part 10 of the base part of the one trolley on the coupling side is locked in the second receiving recess part 20 of the base part V2 of the other trolley on the coupled side, the locking member 1 pivotally attached to the first receiving recess part 10 of the other trolley V2 on the coupled side is locked in the second receiving recess part 20 of the base part V1 of the one trolley on the coupling side, and hence the locking members 1, 1 can be doubly laid and coupled in both directions (see FIG. 9 and FIG. 10).

In the present invention, both the trolleys to be coupled do not have to have the same base part structure, and it is possible to adopt a structure in such the first receiving recess part 10 is provided in the base part V1 of the trolley on the coupling side, the second receiving recess part 20 is provided in the base part V2 of the trolley on the coupled side, and the locking member 1 pivotally attached to the first receiving recess part 10 may be locked in the second receiving recess part 20 to achieve the coupling.

Besides, the present invention is not restricted to the foregoing example and, in short, the design can be modified in various manners without changing a gist of the present invention.

REFERENCE SIGNS LIST

1 locking member
2 constraining piece part
3 gap part
4 lock lever
5 one engaging structure part (protruding part)
6 first branch part
7 second branch part
8 gap part
9 protruding part
10 first receiving recess part
10A first receiving part body
10B first bent section
10C third bent section
11 the other engaging structure part (lock receiving part)
14 one constraining wall part
15 the other constraining wall part
20 second receiving recess part
20A second recess part body
20B second bent section
21 second lock receiving part
24 constraining wall part
30 bearing holding raised part
V1 base part of one trolley
V2 base part of the other trolley
P1 to P3 first to third pivots
B1 and B3 first and third bearing parts
B2 second bearing groove

The invention claimed is:

1. A trolley coupling structure which enables coupling base parts of trolleys aligned in a longitudinal or lateral direction, the trolley coupling structure comprising:
    a first receiving recess part which is opened at a base part end edge provided to the base part of one trolley and comprises a first recess part body which extends toward the inner side of the base part and a first bent section which bends in a direction crossing the first recess part body on a tip side, and has an opened upper surface;
    a second receiving recess part which is opened at a base part end edge provided to the base part of the other trolley, comprises a second recess part body extending toward the inner side of the base part and being configured to communicate with the first recess part body and a second bent section bending in a direction crossing the second recess part body on a tip side, and has an opened upper surface; and
    a locking member which is fitted in the first receiving recess part or the second receiving recess part and comprises a body part which is pivotally attached to a base end side of the first recess part body through a pivot and extends along the first recess part body or the second recess part body, and a lock lever comprising a constraining piece part which is configured to be fitted in the first bent section or the second bent section at a tip of the body part and protruding part which is separated from the constraining piece part with a gap therebetween and engages with a lock receiving part formed in the first recess part body or the second recess part body,
    wherein a constraining wall part which constrains movements of the locking member, a first space which is provided in the first bent section or the second bent section and moves the constrained lock lever in an unlocking direction, and a second space configured to pull out the constraining piece part from the first bent section or the second bent section are provided in the first receiving recess part or the second receiving recess part.

2. The trolley coupling structure according to claim 1, wherein a base end of the locking member is divided into a first branch part and a second branch part to form a gap part therebetween, a pair of first and second pivots are laterally protruded on the first branch part, a third pivot is protruded on an outer side of the second branch part, and first and third bearing parts to which a first shaft part and a third shaft part are disposed are formed on a peripheral wall of the first recess part body surrounding the base end side of the locking member, and
    a bearing holding raised part which is closely fitted in the gap part between the first branch part and the second branch part at the time of folding, has a second bearing groove in which the second pivot is fitted, and tilts in a direction along which a sidewall contacting with the second branch part is separated from the third bearing groove is provided in the first or second receiving recess part.

3. The trolley coupling structure according to claim 1, wherein the first bent section of the first receiving recess part and the second bent section of the second receiving recess part are formed to be symmetrical with an axial line of the pivos of the first receiving recess part as a center.

4. The trolley coupling structure according to claim 1, wherein the bearing portion has a protruding portion whose recess part protrudes outward on the base end side of the first branch part, the first bearing part is formed on a peripheral wall of the protruding portion, a protruding portion which achieves close fitting and protrudes outward is formed to the first branch part in correspondence with the protruding portion, and the first shaft part is formed on the peripheral wall of the protruding portion.

* * * * *